Figure 1:
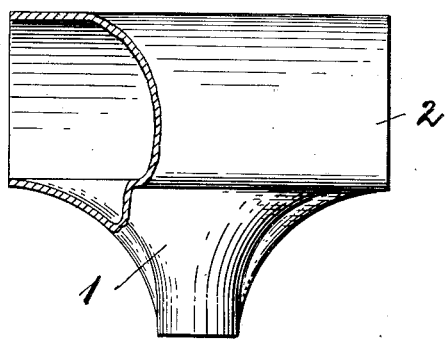

Jan. 15, 1924.

R. C. WILSON ET AL 1,480,587

ELECTRIC WIRING SYSTEM

Filed June 10, 1922

INVENTORS
Ray C. Wilson and Harry J. Arnold
BY
their ATTORNEY.

Patented Jan. 15, 1924.

1,480,587

UNITED STATES PATENT OFFICE.

RAY C. WILSON, OF NEW YORK, AND HARRY S. ARNOLD, OF BROOKLYN, NEW YORK.

ELECTRIC WIRING SYSTEM.

Application filed June 10, 1922. Serial No. 567,260.

*To all whom it may concern:*

Be it known that we, RAY C. WILSON, a citizen of the United States, and residing at New York city, N. Y., and HARRY S. AR-NOLD, a citizen of the United States, residing at Brooklyn, in the county of Kings and State of New York, have invented certain new and useful Improvements in Electric Wiring Systems, of which the following is a specification.

Our invention relates to the wiring of buildings, more especially large office buildings, where great flexibility is required to suit the various needs and desires of tenants, as to the arrangement of electric lighting fixtures or other electric devices and apparatus. At present a floor-wiring system is used which however has the great disadvantage that any changes to be made after the floor has been laid involve a more or less heavy expense. To overcome this disadvantage, which in some cases may become even quite serious, is the purpose of our invention, which aims to do away with the great expense referred to and whereby at the same time any changes subsequently to be undertaken can be carried out with much less work and therefore at a considerable saving of time and expense. With this end in view, our new system of wiring consists in overhead or ceiling wiring, in which at certain intervals wire-outlets are provided which are embedded in the ceiling in such a way that their outlet ends are flush with the ceiling, and as these ends are closed by small screw-plugs the outlets are completely concealed by the plaster of the ceiling, their location being marked, of course, on the building plans. These wire outlets are connected by wire race-ways or channels through which the electric wires may be drawn. The wire outlets may be made either separately and provided with upturned edges adapted to receive the wire race-way, or they may be made integral with a portion of a wire raceway, so that the intervening sections of wire raceways may be easily laid in alinement with the said raceway portions. The outlets and the wire raceways are completely embedded in the concrete forming the ceiling.

Figure 2:
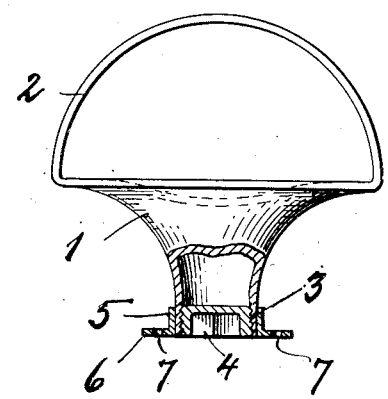
Figure 3:
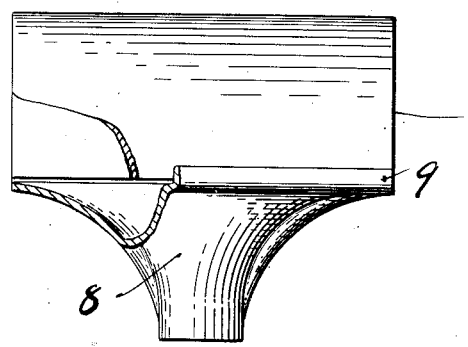
Figure 4:
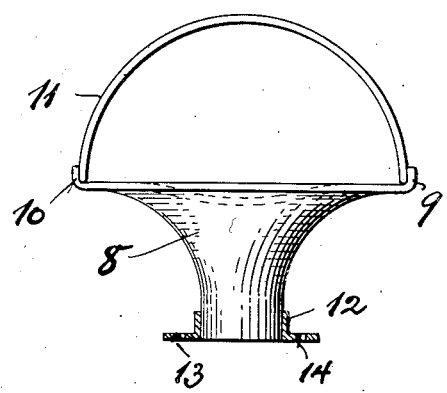
Figure 7:
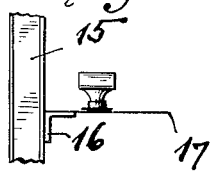
Figure 5:
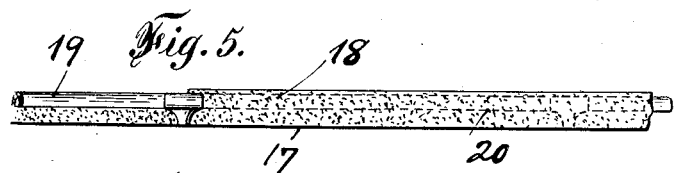
Figure 6:
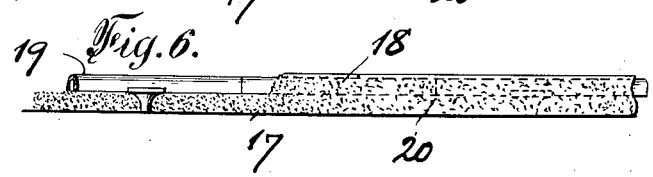
Figure 8:
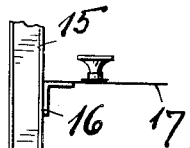

For a better understanding of our invention we refer to the annexed drawing, wherein Fig. 1 is a side elevation of one form of wire-outlet made integral with a portion of a wire raceway; Fig. 2 is a front-view thereof; Fig. 3 shows a side elevation of a wire-outlet with upturned edges with a portion of a wire raceway between the said edges; Fig. 4 is a front-view of this construction; Figs. 5 and 6 show diagrammatically the position of the wire-raceways and outlets in a concrete ceiling, while the latter is being under construction; Figs. 7 and 8 are details showing application of one type of outlet fitting to the form.

The wire-outlet shown in Figs. 1 and 2 comprises the outlet proper 1 and a portion of a wire raceway 2 formed integrally with the outlet. The outlet 1, as clearly shown has slightly curved walls, so that the wires, as they are drawn through the wire raceway, can be readily fished out through the outlets without any obstruction being in the way. The outlet end of the wire outlet is provided with an inner, or female, thread 3 adapted to receive a shallow screw-plug 4, which is removed prior to an electric light fixture or other device, being attached to the outlet. In order to hold the outlet in place, before the ceiling is made, there is slipped over the outlet end of the wire-outlet a thimble 5 provided with a flange 6 having holes 7 therein for the purpose hereinafter described.

In the embodiment shown in Figs. 3 and 4, the wire-outlet 8 is a part by itself. While of the same general shape as the wire outlet 1 shown in Figs. 1 and 2, it is formed with upturned edges 9, 10 adapted to receive between them a section of the wire raceway 11. Also in this form the wire-outlet is provided at its outlet end with a female thread (not shown) for the reception of a screw-plug as shown in Fig. 2, and on the outside with a flanged thimble 12 having holes 13 and 14.

The use of these wire-outlets in our new overhead, or ceiling, wiring system is diagrammatically illustrated in Figs. 5 and 6, Fig. 5 showing the use of the wire-outlet shown in Figs. 1 and 2, while Fig. 6 shows the use of the wire-outlet shown in Figs. 3 and 4.

In using our new system we proceed as follows:

15 are supposed to be vertical iron beams with angle-irons 16 attached thereto. On these angle-irons 16 rest the wooden boards 17 on which the concrete ceiling 18 is formed. Before the latter is made, the wire-outlets shown in either Figs. 1 and 2 or in Figs. 3 and 4 are temporarily fastened to the wooden boards 17 by nails or other suitable fastening means being driven through the holes in the flanges shown in Figs. 3 and 4, so that the position of these outlets can not be disturbed. The outlets are arranged at any desired intervals, say six feet apart from each other, or more or less. After the wire-outlets have thus been placed in position, the concrete is poured on the boards 17 and around the wire-outlets so as to embed the outlets as clearly shown in Figs. 5 and 6. According to Fig. 5 showing the use of wire-outlets formed integral with a portion of the wire-raceway, the concrete is poured to a height only reaching the portion of the wire raceway 2, as shown by the left half of Fig. 5, whereas according to Fig. 6 the concrete is poured to reach the upturned edges 9, 10 of the wire-outlet. After this first layer of concrete has sufficiently hardened, the wire raceways 19 are laid on the top of the hardened mass of concrete in line with the wire-outlets. These wire raceways are preferably of the shape shown in Figs. 1 to 4, i. e. they are of semi-circular cross-section, and they may be made of any suitable, preferably non-conducting material, such as fibre, wood, pressed pulp, or the like. They are made in sections as shown, so that they can be more easily handled and won't warp or become otherwise deformed. In this manner, an uninterrupted wire raceway is formed provided at certain intervals with the wire-outlets, which may be arranged at any desired distance from each other. After the wire raceways have thus been laid, concrete is poured around them so as to completely embed the same, as shown in the right half of Figs. 5 and 6. When the entire mass of concrete is hardened and the boards 17 are subsequently removed, the outlet ends of the wire outlets will be flush with the underside of the ceiling 20, so that after the plaster has been applied to the ceiling, the wire-outlets will be completely hidden from view, their outlet ends being closed by screw-plugs, such as the plug 4 shown in Fig. 2. The location of these wire-outlets can be easily determined from the building plan, on which they are marked, and when it is desired to connect up with an electric lighting fixture or other electrical device, all that is necessary is to scrape off the plaster hiding the plug 4, remove the plug, fish out one of the wires through the now open outlet end of the wire outlet, and then, after the connection has been made, to screw the fixture into the wire outlet, in place of the plug. Thus, it will be easily seen that with our new system of ceiling-wiring, electric lighting fixtures or any other fixtures or connections, can be easily removed and placed in another position, along the wire raceways, or more fixtures can be added without much expenditure of either time or expense. In this manner a very flexible wiring system is produced that will readily adapt itself to the needs of any tenant as regards electric lighting or other fixtures.

Instead of placing the raceways connecting the various outlets directly on the concrete base formed by the first layer of concrete, a strip or pad made of similar material as the raceway may be used as a base for the raceway. In that case it would be possible, if desired, to drill through the underside of the ceiling and to tap the said base at that particular point of the raceway so as to permit a fitting or other device to to be connected at that point.

We claim as our invention:

1. Overhead flexible electrical distribution comprising in combination with a ceiling structure, a line of conduit or wire raceway embedded therein, providing continuous passage for the fishing of electric wires and having outlets at desired intervals opening downwardly through the ceiling and provided with covers closing the tops of the same conforming to and constituting continuations of the raceway and thereby enabling the drawing out of the wiring at any of said outlets, the insertion of wiring into the conduit through said outlets, or the feeding of wiring through the conduit past said outlets.

2. The structure of claim 1 in which the outlets are provided by fixtures open to the full interior of the conduit at their upper ends and having funnel shaped extensions opening downwardly to the ceiling and providing for the bending of the wire on easy angles on entering or withdrawing the wire through such outlets.

3. The structure of claim 1 in which the outlets are each made up of a funnel shaped box structure opening down through the ceiling and an arched cover secured to the top of the box and constructed as a housing forming an intermediate part of the conduit and receiving the ends of adjoining sections of the conduit.

4. The structure of claim 1 in which the outlets are provided by boxes opening down through the ceiling and covers of arched construction secured to the tops of such boxes and constructed as housings forming intermediate sections of the conduit and receiving the adjoining ends of sections of conduit.

5. The structure of claim 1 in which the wire raceway is open along the bottom to enable direct entry from below at any desired points between the outlets aforementioned.

6. An overhead flexible electrical distribution outlet fixture comprising a downwardly tapering box structure having a reduced open lower end adapted to be exposed at the face of the ceiling slab and inclined side walls extending to the wider open upper end of the same, and a cover secured to and closing the top of said box structure and provided with means for receiving and securing the adjoining ends of conduit sections.

7. The method of constructing a flexible overhead electrical distribution system which comprises securing on the form for the ceiling, a series of downwardly opening outlet fixtures positioned at desired intervals, pouring the material of the ceiling slab about said fixtures up to the approximate level of the fixture tops, permitting the body of said slab to solidify, then laying on top of the hardened slab, raceways connecting the outlet fixtures and closing the tops of the fixtures with covers forming continuations of the raceways and finally pouring a second layer of concrete over the hardened ceiling slab to thereby embed the raceways and covers.

8. The method of claim 7 in which raceways open along one side are used and are laid with their open sides downwardly to give access directly thereinto from below at any desired points in the length of the same.

In testimony whereof we affix our signatures.

RAY C. WILSON,
HARRY S. ARNOLD.